United States Patent [19]

Leihgeber

[11] 4,031,794
[45] June 28, 1977

[54] PORTABLE JIG FOR RAFTER CUTS AND OTHER ANGLE CUTS

[76] Inventor: Joseph Q. Leihgeber, Rte. No. 1, Box 164A, Fayetteville, Ohio 45118

[22] Filed: June 25, 1976

[21] Appl. No.: 699,694

[52] U.S. Cl. .............................. 83/829; 83/471.3; 83/477.1; 83/745
[51] Int. Cl.² .......................................... B27G 9/04
[58] Field of Search ............ 83/464, 465, 454, 455, 83/471.3, 477.1, 486.1, 743, 745

[56] References Cited

UNITED STATES PATENTS

| 1,746,153 | 2/1930 | Hampton | 269/253 X |
| 2,596,524 | 5/1952 | Bridwell | 83/486.1 X |
| 2,627,287 | 2/1953 | McCluskey | 83/486.1 X |
| 2,630,146 | 3/1953 | Van Tuyl | 83/471.3 X |
| 2,651,333 | 9/1953 | Spinney | 83/471.3 X |
| 2,718,907 | 9/1955 | Fjalstad | 83/486.1 X |
| 2,903,026 | 9/1959 | Frydenlund | 83/471.3 X |
| 3,213,904 | 10/1965 | McManama | 83/465 X |

Primary Examiner—J. M. Meister
Attorney, Agent, or Firm—Melville, Strasser Foster & Hoffman

[57] ABSTRACT

A portable saw guide for operation in combination with a hand operable saw. The saw guide comprises a base member adapted for clamping to an elongated horizontally disposed workpiece supporting surface wherein a first portion of the base member extends transversely under the supporting surface while a second portion is disposed to one side thereof. A pin is rotatively associated with the second portion of the base member and includes a head section for pivotally receiving one end of an elongated guide blade. The guide blade is swingable between a substantially vertical position and a substantially horizontal position overlying the workpiece wherein the guide blade is rotatable with the pin so as to overlie the workpiece at any selected angle relative thereto. Means are also provided for locking the pin to maintain the guide blade at the selected angle.

8 Claims, 3 Drawing Figures

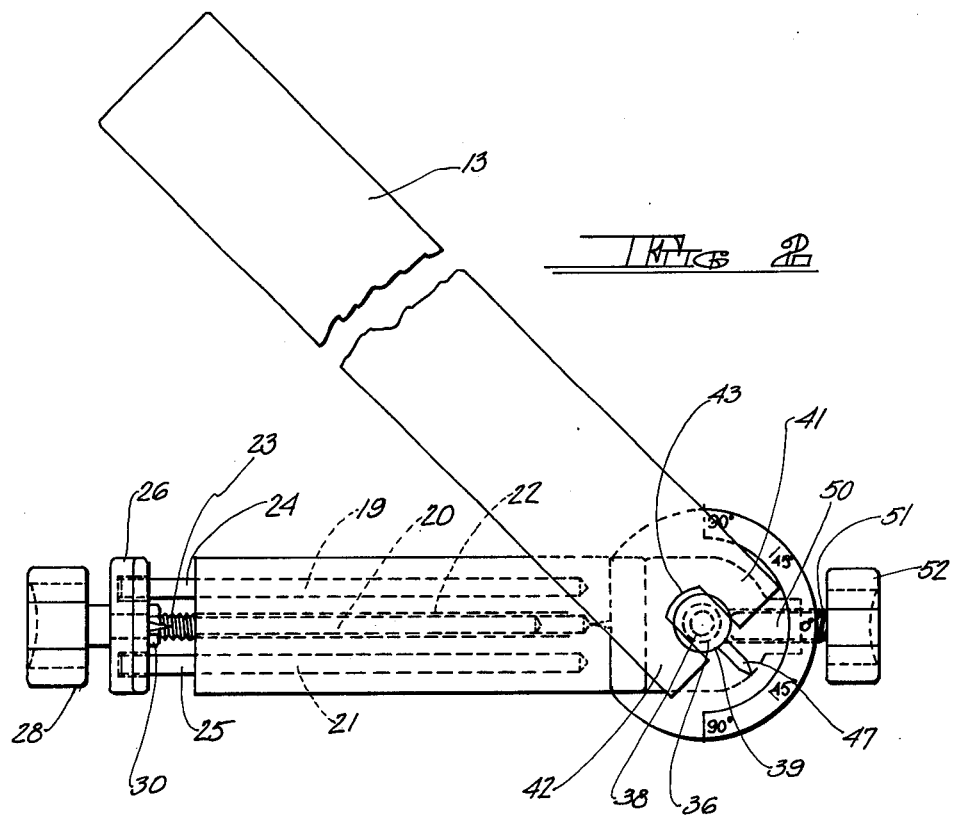
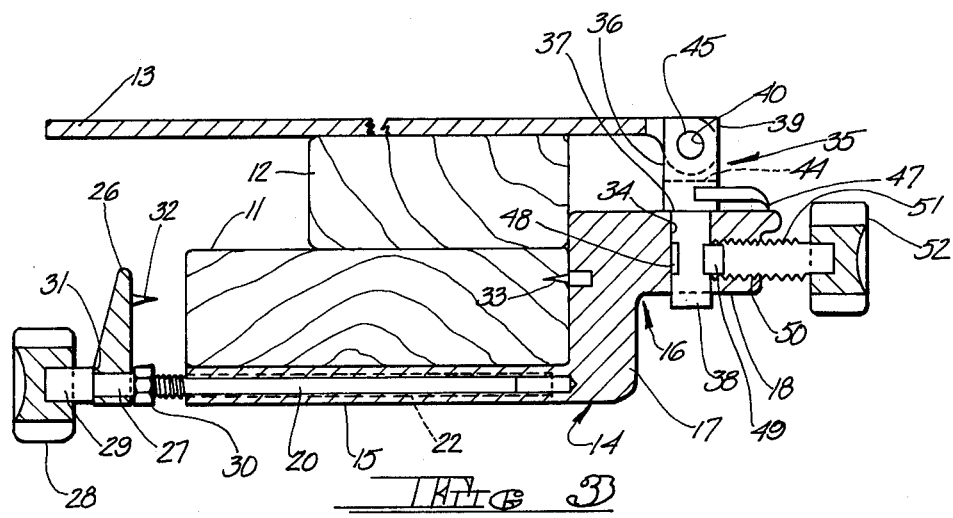

ed.

PORTABLE JIG FOR RAFTER CUTS AND OTHER ANGLE CUTS

BACKGROUND OF THE INVENTION

This invention relates generally to apparatus of the type used in combination with hand or power saws for accurately cutting rafter boards and the like at preselected angles. More particularly, the apparatus of the present invention relates to portable devices of the type having means for guiding the blade of a saw to enable the execution of precise rafter and other angle cuts.

It is frequently necessary, particularly in the building industry trade, to precut wooden members at various angles with a high degree of precision. For example, in preparing rafters for use in the construction of buildings, it is necessary to precut the rafter boards at precise angles depending upon the characteristics of the particular roof being constructed. In this regard, it will be recognized that pertinent characteristics which must be considered include such variables such as the rise and span of the roof and the like.

The industry has devised numerous devices to facilitate the angular cutting of wooden members such as rafters boards. The prior art devices typically include members for guiding the saw blade along the boards and indexing means for positioning the guide members relative to the boards at preselected angles in a horizontal plane. It is also known in the prior art to provide means whereby the device may be clamped to a work table for the convenience of the operator as well as means for allowing the guide to be adjusted in a vertical direction. Examples of prior art devices of the foregoing type may be found in U.S. Pat. No. 2,714,903, in the name of P. L. Miller, and entitled PORTABLE POWER SAW GUIDE AND SUPPORTING MEANS; U.S. Pat. No. 2,596,524, in the name of G. L. Bridwell, and entitled PORTABLE POWER SAW GUIDE AND SUPPORTING MEANS; U.S. Pat. No. 2,802,493, in the name of K. Horneland, and entitled GUIDE FOR PORTABLE POWER SAWS, and U.S. Pat. No. 2,589,554, in the name of J. P. Killian, and entitled SAW GUIDE FOR PORTABLE POWER-DRIVEN AND-OPERATED CIRCULAR SAWS.

While the prior art devices are generally acceptable in terms of accuracy, they are typically relatively large and expensive and therefore not altogether satisfactory from a practical viewpoint. In cutting rafters, for example, it would be highly desirable to appropriately cut each end of the board before removing it from its work supporting surface by utilizing a pair of saw guides each positioned at an opposite end of the rafter so that each piece of lumber would have to be handled only once. However, such a procedure is not presently practical due both to the size of available saw guides as well as the expense involved in purchasing duplicate devices. In addition, the relatively large size of prior art devices results in substantial inconvenience to the builder who must continuously handle the unit in an on the job situation.

SUMMARY OF THE INVENTION

The present invention provides an improved portable saw guides useful for facilitating the accomplishment of rafter cuts and other angle cuts. The saw guide may be manufactured extremely inexpensively and considerably smaller than comparable prior art devices.

Briefly, the improved saw guide comprises a longitudinal base member and includes means for clamping the base member to an elongated horizontally disposed workpiece supporting surface extending transeversely thereof. The base member includes a first portion underlying the supporting surface and a second portion disposed to one side of the supporting surface.

The second portion of the base member rotatively carries a vertically disposed pin for rotation about its axes. The pin includes a head section seated on the second portion of the base member and a cylindrical extension depending from the head section through an aperture in the base member.

An elongated saw guide blade is pivotally secured at one end thereof to the head section of the pin and is swingable between a position vertically disposed from the workpiece to a position substantialy overlying the workpiece. The guide blade is also rotatable with the pin whereby its position overlying the workpiece may be adjusted to any selected angle relative thereto. Means are provided for urging a break pad into frictional engagement with the cylindrical extension of the pin for locking the pin to maintain the guide blade at the selected angle.

BRIEF DECRIPTION OF THE DRAWINGS

FIG. 2 is a plan view of the saw guide in accordance with the present invention.

FIG. 3 is a cross sectional view taken along line 3—3 of FIG. 2 with the saw guide blade set at 0°.

DESCRIPTION OF THE PREFERRED EMBODIMENT

Figure 1:
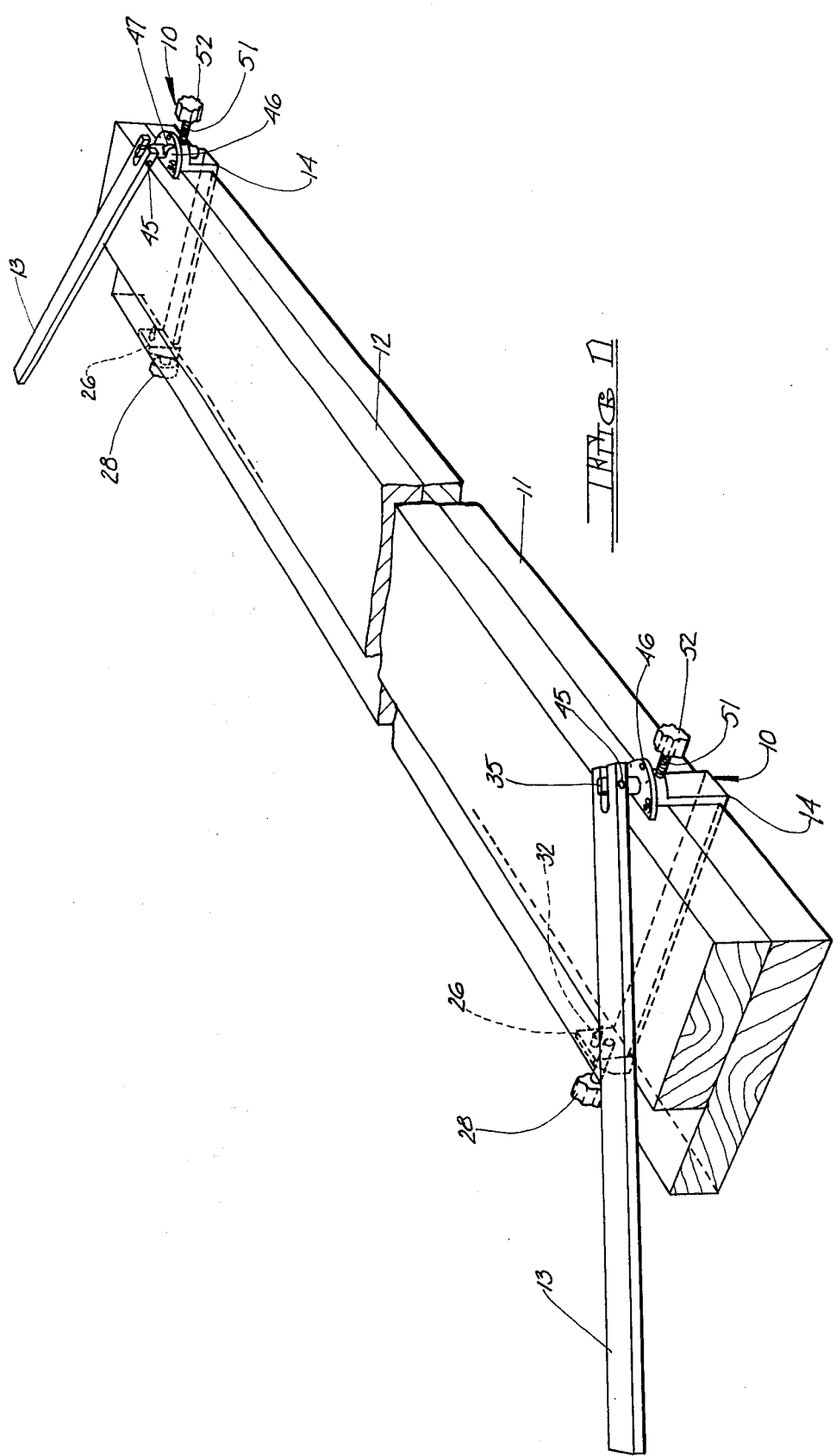
FIG. 1 is a perspective view of a pair of saw guides in accordance with the present invention mounted at either end of a work supporting surface for cutting a rafter board.

Referring more particularly to the drawings, wherein like numerals indicate like parts, the portable saw guide 10 of the present invention is shown in perspective in FIG. 1. Due to the small size and inexpensive nature of the saw guide 10, it is convenient to utilize the guide in pairs. Accordingly, FIG. 1 shows a pair of saw guides 10 mounted at opposite ends of a workpiece supporting surface 11. A rafter board 12 or the like is supported on the workpiece supporting surface 11 and underlies the guide blades 13 of the saw guides 10. The guide blades 13, which are presetable at selected angles as will be described in more detail hereinafter, function to guide the cutting blade of a power saw or the like to cut the workpiece 12 at the selected angles. By thus utilizing a pair of saw guides 10, the workpiece 12 need be handled only once while appropriately cutting both ends thereof. It will be appreciated that the workpiece supporting surface 11, as well as the workpiece 12, will typically be horizontally suspended between a pair of saw horses or the like for the convenience of the operator.

The detailed structure of the saw guide 10 of the present invention is more particularly shown in FIGS. 2 and 3. The saw guide 10 comprises a base member 14 having a first horizontally extending portion 15 transversely underlying the workpiece supporting surface 11. A second portion 16 of the base member 14 is disposed to one side of the workpiece supporting surface 11 and includes a first section 17 extending vertically upward from horizontal portion 15 and a second section 18 extending horizontally from vertical section 17.

The horizontal portion 15 of base member 14 includes three laterally spaced bores 19, 20 and 21. Longitudinal bore 20 is internally threaded as shown at 22 for cooperatively receiving an externally threaded clamping bolt 23. Longitudinal bores 19 and 21 are adapted to slidably receive guide pins 24 and 25 which are connected at one end to jaw 26. One end of bolt 23 loosely extends through jaw 26 at 27 and is securely fastened to a handle 28 at projection 29. A nut 30 is provided in association with bolt 23 for maintaining jaw 26 in firm engagement with the shoulder 31 of projection 29.

It will be appreciated that by rotating handle 28 bolt 23 will be caused to advance within bore 20 thereby advancing jaw 26 toward the workpiece supporting surface 11. As jaw 26 is advanced toward workpiece supporting surface 11 it will be maintained in a vertical orientation by guide pins 24 and 25 which will be slidably carried thereby into longitudinal bores 19 and 21. In order to effect a secure engagement of base member 14 to the workpiece supporting surface 11, the jaw 26 and the vertical section 17 may carry a pair of opposed teeth members 32 and 33 adapted to bite into the workpiece supporting surface 11 thereby securely sandwiching the workpiece supporting surface therebetween. It will be recognized that in order to unclamp the saw guide 10 from the workpiece supporting surface 11, handle 28 is rotated in the opposite direction to withdraw bolt 23 and guide pins 24 and 25 from longitudinal bores 19, 20 and 21.

As most clearly shown in FIG. 3, the horizontal section 18 of base member 14 includes an aperture 34 for receiving a vertically disposed pin 35. Pin 35 comprises a head portion 36 having a shoulder 37 seated on horizontal section 18. A cylindrical extension 38 depends from head portion 36 rotatively through aperture 34. Also, the head portion 36 of pin 35 includes an upper tapered section 39 having an aperture 40 extending horizontally therethrough.

With reference to FIG. 2, it will be noted that guide blade 13 is forked at exhibit a pair of laterally disposed extensions 41 and 42. Extensions 41 and 42 slidably straddle the tapered section 39 of pin 35 and rest upon shoulder 44. Each extension 41,42 is undercurled as shown in FIG. 3 to facilitate reception of pin 45 which horizontally extends through the undercurled portions of extensions 41 and 42 as well as aperture 40 to pivotally secure guide blade 13 to pin 35. In addition, the foregoing connection associates guide blade 13 with pin 35 for rotation relative to the base member 14.

An index plate 46 surmounting the horizontal section 18 of base member 14 is provided to enable, in cooperation with pointer 47, the selection of a particular cutting angle. That is, an operator may set the saw guide 10 for a particular cutting angle by simple rotating guide blade 13, and thereby pin 35, until pointer 7 overlies the indicia on index plate 46 corresponding to the desired angle. In order to lock guide blade 13 at the selected angle, a locking feature is included in association with cylindrical extension 38 of pin 35. In this regard, it will be noted that cylindrical extension 18 includes, extending at least partially thereabout, an annular depression 48. A brake pad 49 is carried within horizontal internally threaded bore 50 adjacent annular depression 48 and frictionally engageable therewith through the action of externally threaded bolt 51. Bolt 51 is secured at one end to a knob 52 to facilitate rotation thereof. Therefore, in order to lock pin 35 in a particular position, and thereby guide blade 13 at a particular cutting angle, knob 52 is rotated to advance bolt 51 for urging brake pad 49 into frictional engagement with annular depression 48. To unlock pin 35, knob 52 is simply rotated in the reverse direction to unseat brake pad 49 from annular depression 48.

From the foregoing discussion, it will be appreciated that the operation of the saw guide 10 of the present invention is extremely simple. Initially, the saw guide 10 is clamped to workpiece supporting surface 11 by advancing jaw 26 into engagement therewith. Guide blade 13 is then pivoted vertically upward about pivot pin 45 such that workpiece 12 may be horizontally positioned over workpiece supporting surface 11. Guide blade 13 is now pivoted downwardly to a position overlying workpiece 12 as shown in FIG. 3. If, for exaple, an angle cut of 45° is to be made, guide blade 13, and consequently pin 35, is rotated in a horizontal plane until pointer 47 overlies the 45° indicia as shown in FIG. 2. Pin 35 is locked in this position by turning knob 52 to advance bolt 51 for causing brake pad 49 to frictionally engage annular depression 48. It will be understood that the saw blade may now be advanced along the edge of guide blade 13 to execute the 45° angle cut of workpiece 12.

While certain preferred embodiments of the invention have been specifically illustrated and described, it will be understood that the invention is not limited thereto, as many variations will be apparent to those skilled in the art. For example, although various portions or parts of the present invention have been described herein as well as in the appended claims, as being disposed in horizontal or vertical directions, it will be appreciated that such is not considered limiting and that, depending upon the particular frame of reference chosen, these parts could be described otherwise.

The embodiments of the invention in which an exclusive property or privilege is claimed are defined as follows:

1. A portable saw guide for a hand operable saw, said saw guide comprising:
   a. a base member including means for clamping said base member to an elongated horizontally disposed work piece supporting surface wherein said base member includes a first portion extending transversely of and underlying said supporting surface and a second portion disposed to one side of said supporting surface, said second portion of said base member comprising a first section extending vertically upward from said first portion adjacent said work piece supporting surface and a second portion extending horizontally from said first section and in a direction away from said work piece supporting surface, said second section including an aperture extending vertically therethrough;
   b. a vertically disposed pin mounted in said vertical aperature of said second portion of said base member for rotation about its axis, said vertically disposed pin including a head section overlying said second portion and a shoulder having a cross sectional dimension greater than the cross sectional dimension of said aperture for seating said head section on said base member second section overlying said aperture, said vertically disposed pin having a cylindrical extension depending from said shoulder rotatively through said aperture, said cylindrical extension including an annular depression extending at least partially thereabout;

c. an elongated guide blade pivotally secured at one end to said head section and swingable between a position vertically disposed from said work piece and a substantially horizontal position overlying said work piece, said guide blade being rotatable with said pin so as to overlie said work piece at any selected angle relative thereto; and d. means for locking said pin for maintaining said guide blade at said selected angle comprising a brake pad cooperatively associated with said annular depression and means for selectively urging said brake pad into and out of frictional engagement with said annular depression.

2. The portable saw guide according to claim 1 wherein said means for clamping comprises an externally threaded bolt and a jaw member and wherein said first portion of said base member includes a longitudinally extending internally threaded bore for cooperatively receiving said bolt, said bolt carrying said jaw member transversely of said first portion of said base member for longitudinal movement toward and away from said workpiece supporting surface wherein said workpiece supporting surface may be snugly sandwiched between said jaw member and said second section of said base member second portion for clamping said base member thereto.

3. The portable saw guide according to claim 2 wherein said jaw member is loosely mounted on said bolt, said first portion of said base member having a pair of laterally spaced longitudinal bores, one of each side of said internally threaded bore, and including a pair of guide pins secured to said jaw member and slidable within said pair of laterally spaced bores for maintaining said jaw member vertically disposed transversely of said first portion of said base member.

4. The portable saw guide according to claim 2 including means for preventing longitudinal motion of said jaw member relative to said externally threaded bolt.

5. The portable saw guide according to claim 2 wherein said jaw member and said second section of said base member second portion each include a tooth element for engaging said workpiece supporting surface to facilitate clamping of said base member thereto.

6. The portable saw guide according to claim 1 wherein said means for urging comprises an externally threaded bolt and wherein said base member second section includes an internally threaded longitudinally extending bore for coopreatively receiving said bolt, said bore being disposed in alignment with said annular depression such that said bolt is operative for forcing said brake pan into frictional engagement with said annular depression.

7. A portable saw guide according to claim 1 including an indexing plate non-rotatively surmounting said base member second section and having indicia thereon dividing the periphery of said plate into angular divisions and including a pointing element extending from said head section of said vertically disposed pin near said shoulder for pointing to said indicia as said pin is rotated relative to said base member.

8. A portable guide for a hand operable saw, said saw guide comprising;

a. a base member including means for clamping said base member to an elongated horizontally disposed work piece supporting surface, said clamping means comprising an externally threaded bolt and a jaw member loosely mounted on said bolt, said base member including a first portion extending transversely of and underlying said supporting surface and a second portion disposed to one side of said supporting surface, said first portion including a longitudinally extending internally threaded bore cooperatively receiving said bolt, said bolt carrying said jaw member transversely of said first portion of said base member for longitudinal movement toward and away from said work piece supporting surface, said first portion of said base member having a pair of laterally spaced longitudinal bores, one of each side of said internally threaded bore, and including a pair of guide pins secured to said jaw member and slidable within said pair of laterally spaced bores for maintaining said jaw member vertically disposed transversely of said first portion of said base member, said second portion of said base member comprising a first section extending vertically upward from said first portion adjacent said work piece supporting surface and a second section extending horizontally from said first section and in a direction away from said work piece supporting surface, said second section including an aperture extending vertically therethrough, wherein said work piece supporting surface may be snugly sandwiched between said jaw member and said second section of said base member second portion for clamping said base member thereto;

b. a vertically disposed pin mounted in said vertical aperture of said second portion of said base member for rotation about its axis, said vertically disposed pin including a head section overlying said second portion;

c. an elongated guide blade pivotally secured at one end to said head section and swingable between a position vertically disposed from said work piece and a substantially horizontal position overlying said work piece, said guide blade being rotatable with said pin so as to overlie said workpiece at any selected angle relative thereto;

d. means for locking said pin for maintaining said guide blade at said selected angle; and e. means for preventing longitudinal motion of said jaw member relative to said externally threaded bolt.

* * * * *